US011055318B2

(12) United States Patent
Tylenda

(10) Patent No.: US 11,055,318 B2
(45) Date of Patent: Jul. 6, 2021

(54) TARGET NUMBER OF CLUSTERS BASED ON INTERNAL INDEX FIBONACCI SEARCH

(71) Applicant: Intel Corporation, Santa Clara, CA (US)

(72) Inventor: Piotr Tylenda, Lysomice (PL)

(73) Assignee: Intel Corporation, Santa Clara, CA (US)

( * ) Notice: Subject to any disclaimer, the term of this patent is extended or adjusted under 35 U.S.C. 154(b) by 613 days.

(21) Appl. No.: 15/691,807

(22) Filed: Aug. 31, 2017

(65) Prior Publication Data

US 2019/0065577 A1 Feb. 28, 2019

(51) Int. Cl.
| | | |
|---|---|---|
| *G06F 16/00* | (2019.01) | |
| *G06F 16/28* | (2019.01) | |
| *G06F 16/22* | (2019.01) | |
| *G06F 16/23* | (2019.01) | |
| *G06F 16/35* | (2019.01) | |

(52) U.S. Cl.
CPC ............ *G06F 16/285* (2019.01); *G06F 16/22* (2019.01); *G06F 16/2365* (2019.01); *G06F 16/355* (2019.01)

(58) Field of Classification Search
CPC ....... G06F 16/22; G06F 16/285; G06F 16/355
See application file for complete search history.

(56) References Cited

U.S. PATENT DOCUMENTS

| | | | | | |
|---|---|---|---|---|---|
| 5,732,277 | A | * | 3/1998 | Kodosky | G06F 3/04817 717/125 |
| 6,412,054 | B1 | * | 6/2002 | Bhatia | G06F 3/0611 707/999.002 |
| 8,849,811 | B2 | * | 9/2014 | Bonanni | G06F 16/35 707/728 |
| 9,355,171 | B2 | * | 5/2016 | Thomas | G06F 16/355 |
| 9,424,337 | B2 | * | 8/2016 | Hall | G06F 16/285 |
| 9,436,760 | B1 | * | 9/2016 | Tacchi | G06N 5/022 |
| 2002/0107858 | A1 | * | 8/2002 | Lundahl | G06K 9/6218 |
| 2003/0074369 | A1 | * | 4/2003 | Schuetze | G06F 16/355 |
| 2005/0262056 | A1 | * | 11/2005 | Hamzy | G06F 8/36 |
| 2007/0214186 | A1 | * | 9/2007 | Yang | G06K 9/6282 |
| 2007/0250522 | A1 | * | 10/2007 | Perrizo | G06K 9/6282 |
| 2009/0248725 | A1 | * | 10/2009 | Bhattacharjee | H03M 7/30 |
| 2010/0217763 | A1 | * | 8/2010 | Park | H04B 7/0413 707/737 |
| 2012/0296891 | A1 | * | 11/2012 | Rangan | G06F 16/3347 707/722 |

(Continued)

OTHER PUBLICATIONS

Hauser et al.: "Statistical Analysis of Catalogs of Extragalactic Objects. II. the Abell Catalog of Rich Clusters", (Year: 1973).*

(Continued)

*Primary Examiner* — Jean M Corrielus
(74) *Attorney, Agent, or Firm* — Jordan IP Law, LLC

(57) ABSTRACT

Systems, methods and apparatuses may include technology to group data objects of a dataset into first and second groups respectively based on a first and second number of clusters for a search of the dataset, evaluate the first and second groups to determine respective first and second cluster validation indexes, and adjust one or more of the first and second number of clusters based on the first and second cluster validation indexes.

20 Claims, 12 Drawing Sheets

(56) References Cited

U.S. PATENT DOCUMENTS

| | | | | |
|---|---|---|---|---|
| 2014/0143115 A1* | 5/2014 | Kono | ............... | G06Q 40/04 |
| | | | | 705/37 |
| 2014/0203175 A1* | 7/2014 | Kobrinsky | ............ | H01L 24/83 |
| | | | | 250/214.1 |
| 2014/0229473 A1* | 8/2014 | Mehrotra | ........... | G06F 16/3347 |
| | | | | 707/728 |
| 2015/0066939 A1* | 3/2015 | Misra | ................. | G06F 16/355 |
| | | | | 707/739 |
| 2016/0034525 A1* | 2/2016 | Neels | ................. | G06F 16/285 |
| | | | | 707/737 |
| 2016/0364468 A1* | 12/2016 | Huang | .............. | G06F 16/285 |

OTHER PUBLICATIONS

W. Rezaei et al.: "Set Matching Measures for External Cluster Validity", (Year: 2015).*

A cluster validity measure with a hybrid parameter search method for the support vector clustering algorithm, Wang et al., (Year: 2008).*

Charles Elkin, "Using the Triangle Inequality to Accelerate k-Means", Proceedings of the Twentieth International Conference on Machine Learning, 2003, 7 pages.

\* cited by examiner

US 11,055,318 B2

1

TARGET NUMBER OF CLUSTERS BASED ON INTERNAL INDEX FIBONACCI SEARCH

TECHNICAL FIELD

Embodiments generally relate to text mining. More particularly, embodiments relate to determining a target number of clusters based on internal index Fibonacci search.

BACKGROUND

Clustering (or cluster analysis) may refer to one task of exploratory text mining and/or unsupervised machine learning which aims at grouping a set of data objects in such a way that data objects assigned to one cluster are more similar to each other than to those assigned to other groups. The similarity can be measured in various ways. One approach may include using three dimensional (3D) Euclidean distance when grouping points in 3D space. This approach may be extended to more complex similarity measures, such as cosine similarity which may be used in clustering of text documents for text mining.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
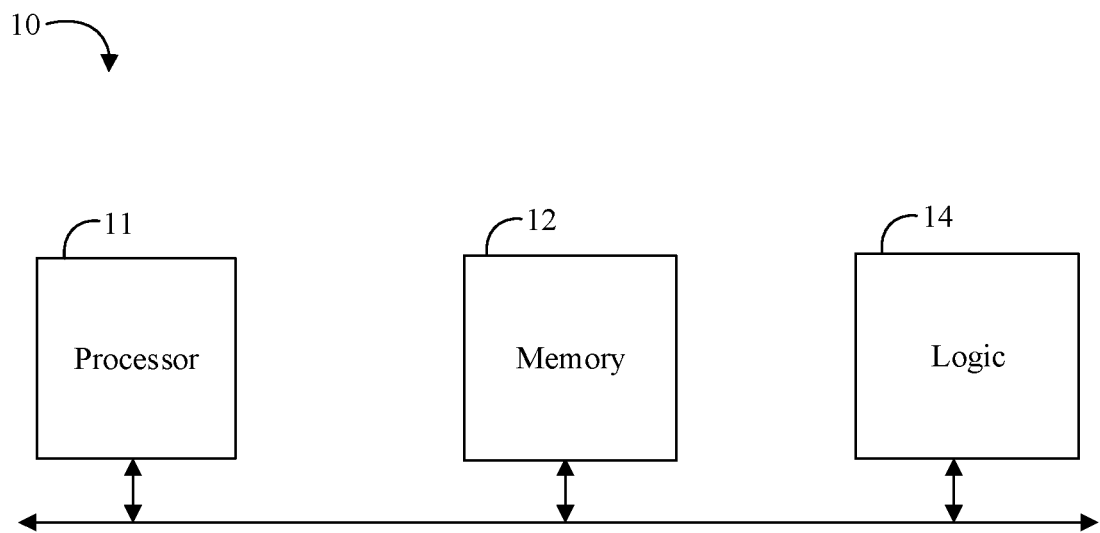
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 14 communicatively coupled to the processor 11 to group data objects of a dataset into first and second groups (e.g., clusters) respectively based on a first and second number of clusters for a search of the dataset, evaluate the first and second groups to determine respective first and second cluster validation indexes, and adjust one or more of the first and second number of clusters based on the first and second cluster validation indexes (e.g., to converge near a peak cluster validation index). For example, the logic 14 may be further configured to determine a target number of clusters based on the first and second number of clusters when the first and second number of clusters have converged near a peak cluster validation index. In some embodiments, the logic 14 may be configured to evaluate the first and second groups to determine respective first and second internal cluster validation indexes. For example, the logic 14 may evaluate the first and second groups to determine respective first and second Calinski-Harabasz (CH) indexes. In some embodiments, the logic 14 may be further configured to adjust one or more of the first and second number of clusters based on Fibonacci numbers (e.g., associated with the determined first and second internal cluster validation indexes). In any of the foregoing examples, the dataset may comprise a set of text documents.

Embodiments of each of the above processor 11, memory 12, logic 14, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 14, grouping data objects of a dataset into first and second groups, evaluating the first and second groups to determine respective first and second cluster validation indexes, and/or adjusting one or more of the first and second number of clusters, etc.).

Figure 2:
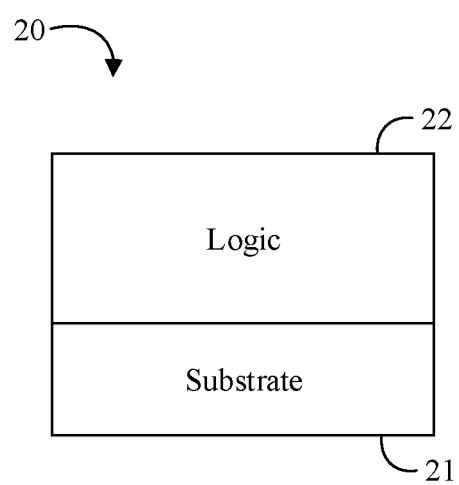
FIG. 2 is a block diagram of an example of a semiconductor package apparatus according to an embodiment.

Turning now to FIG. 2, an embodiment of a semiconductor package apparatus 20 may include a substrate 21, and logic 22 coupled to the substrate 21, wherein the logic 22 is at least partly implemented in one or more of configurable logic and fixed-functionality hardware logic. The logic 22 coupled to the substrate 21 may be configured to group data objects of a dataset into first and second groups (e.g., clusters) respectively based on a first and second number of clusters for a search of the dataset, evaluate the first and second groups to determine respective first and second cluster validation indexes, and adjust one or more of the first and second number of clusters based on the first and second cluster validation indexes (e.g., to converge near a peak cluster validation index). For example, the logic 22 may be further configured to determine a target number of clusters based on the first and second number of clusters when the first and second number of clusters have converged near a peak cluster validation index. In some embodiments, the logic 22 may be configured to evaluate the first and second groups to determine respective first and second internal cluster validation indexes. For example, the logic 22 may evaluate the first and second groups to determine respective first and second CH indexes. In some embodiments, the logic 22 may be further configured to adjust one or more of the first and second number of clusters based on Fibonacci numbers (e.g., associated with the determined first and second internal cluster validation indexes). In any of the embodiments described herein, the dataset may comprise a set of text documents.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
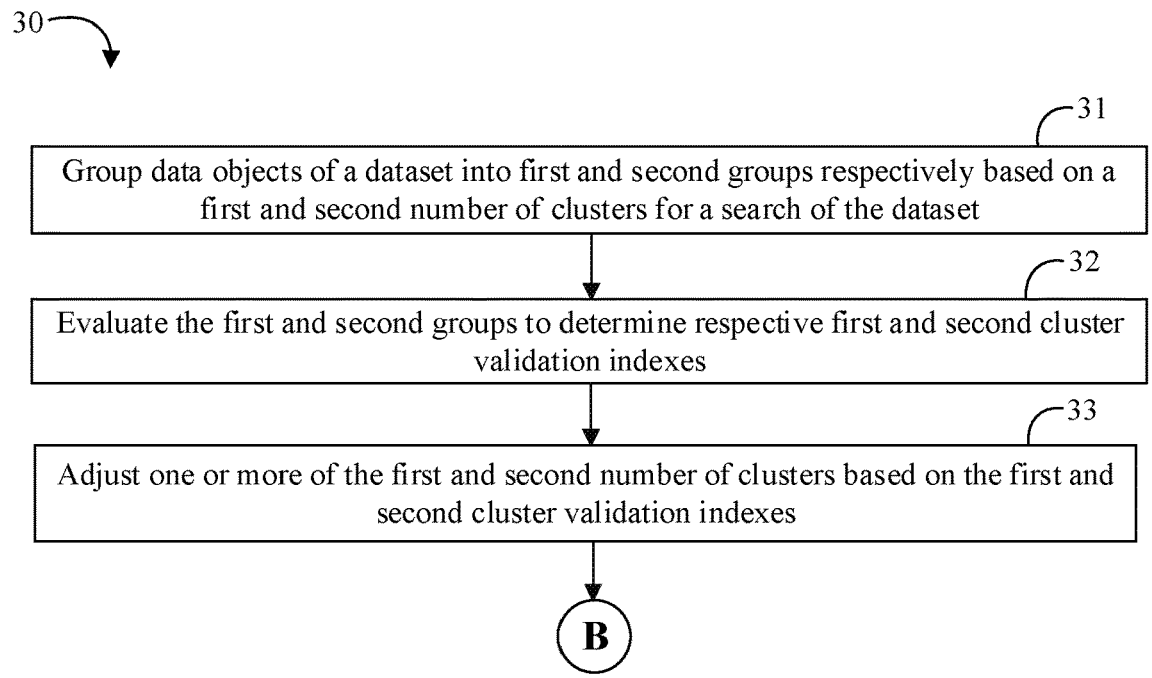
FIGS. 3A to 3B are flowcharts of an example of a method of adjusting a number of clusters according to an embodiment.
Figure 3B:
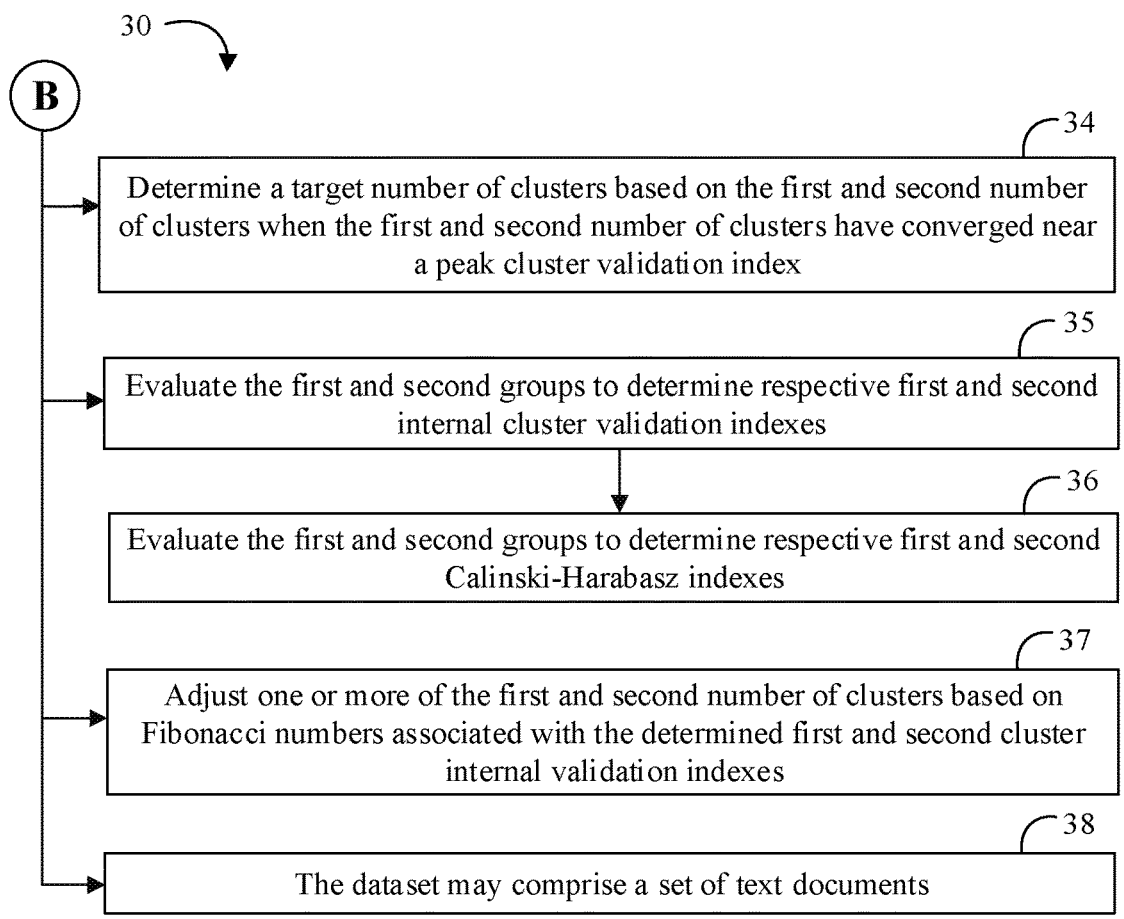

Turning now to FIGS. 3A to 3B, an embodiment of a method 30 of adjusting a number of clusters of a dataset may include grouping data objects of the dataset into first and second groups (e.g., clusters) respectively based on a first and second number of clusters for a search of the dataset at block 31, evaluating the first and second groups to determine respective first and second cluster validation indexes at block 32, and adjusting one or more of the first and second number of clusters based on the first and second cluster validation indexes at block 33. For example, the method 30 may also include determining a target number of clusters based on the first and second number of clusters when the first and second number of clusters have converged near a peak cluster validation index at block 34. Some embodiments may further include evaluating the first and second groups to determine respective first and second internal cluster validation indexes at block 35. For example, the method 30 may include evaluating the first and second groups to determine respective first and second CH indexes at block 36. Some embodiments may also include adjusting one or more of the first and second number of clusters based on Fibonacci numbers associated with the determined first and second internal cluster validation indexes at block 37. In any of the foregoing examples, the dataset may comprise a set of text documents at block 38.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in applications (e.g., through an application programming interface (API)) or driver software running on an operating system (OS).

Figure 4:
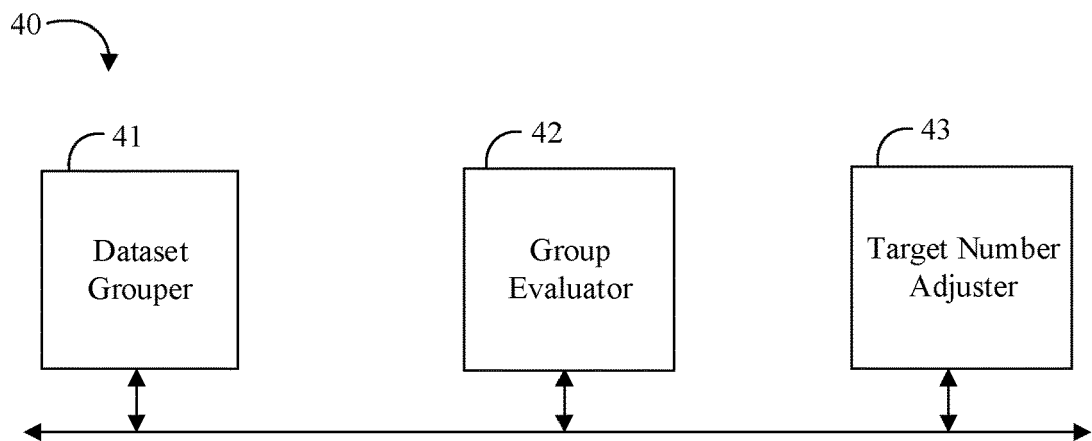
FIG. 4 is a block diagram of an example of a target number setter according to an embodiment.

Turning now to FIG. 4, some embodiments may be logically or physically arranged as one or more modules. For example, an embodiment of a target number setter 40 may include a dataset grouper 41 communicatively coupled to a group evaluator 42 and a target number adjuster 43. For example, the dataset grouper 41 may be configured to group data objects of a dataset into first and second groups (e.g., clusters) respectively based on a first and second number of clusters for a search of the dataset. The group evaluator 42 may be configured to evaluate the first and second groups to determine respective first and second cluster validation indexes. The target number adjuster may be configured to adjust one or more of the first and second number of clusters based on the first and second cluster validation indexes to converge near a peak cluster validation index. For example, the target number setter 40 may be further configured to determine a target number of clusters based on the first and second number of clusters when the first and second number of clusters have converged near the peak cluster validation index. In some embodiments, the group evaluator 42 may be configured to evaluate the first and second groups to determine respective first and second internal cluster validation indexes. For example, the group evaluator 42 may evaluate the first and second groups to determine respective first and second CH indexes. In some embodiments, the target number adjuster 43 may be further configured to adjust one or more of the first and second number of clusters based on Fibonacci numbers associated with the determined first and second internal cluster validation indexes. For example, the dataset may comprise a set of text documents.

Embodiments of the dataset grouper 41, the group evaluator 42, the target number adjuster 43, and other components of the target number setter 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously determine an improved or optimal number of clusters for text mining using an internal index Fibonacci search. Without being limited to such applications, some embodiments may be particularly useful for text mining. Text clustering may be performed using a variety of techniques including hierarchical clustering (e.g., a divisive technique) and partitional clustering. Hierarchical clustering may involve partitioning the cluster in a top-down approach, starting from the whole dataset, dividing it into two or more subsets and repeating the procedure for each of subsets until a convergence criteria is met. On the other hand, partitional clustering may operate on a fixed number of clusters which are, in most cases, mutually exclusive. One example of a partitional clustering technique includes a k-means technique, where "k" corresponds to a target number of clusters. In general text mining, partitional clustering may outperform hierarchical clustering in terms of computational complexity, efficiency and quality of the results. A disadvantage of some partitional clustering applications such as k-means is the requirement to specify the target number of clusters (e.g., the k parameter) beforehand. In some other systems, the k parameter may be determined manually (e.g., by trial and error, or other analysis) or may be preset to an assumed good, known value, which may not necessarily provide good results. Some embodiments may advantageously determine an improved or optimal k parameter automatically before running the partitional clustering application to provide improved or optimal results.

Spherical k-means, which is a variant of general k-means technique, uses cosine similarity as a pseudo-metric (e.g., distance) measure and is specifically designed for text clustering problems and may be considered a relatively fast and efficient text clustering techniques. Unfortunately, even if very efficient compared to other text clustering techniques, spherical k-means may require much more computation power and time than regular k-means used for simple grouping of, for example, objects in 3D Euclidean space. Without being limited to theory of operation, the root cause of these problems may be that documents are represented by large, sparse vectors in n-dimensional space, where n is a count of distinct words/terms in all clustered documents. Such spaces may have thousands of dimensions. For example, the Reuters-21578 R8 (R8) dataset may include 25741 unique terms (e.g., the number of dimensions of the vector space). The larger the vectors, the longer the computation of distance (cosine similarity) between two documents.

Some embodiments may advantageously provide an improved technique for specifying the k parameter for a spherical k-means application in text mining. For example, in some embodiments, the detection of an optimal number of clusters (e.g., the k parameter) may be performed automatically without any human interaction or manual clustering quality assessment. Some embodiments may be suitable for usage in big data environment due to good scalability properties. Alternatively, or additionally, some embodiments may be used as a standalone technique for detecting an optimal number of clusters in a given document dataset. The output number of clusters may be used for statistical purposes, presentation, or, for example, as an input parameter for other clustering techniques. Some embodiments may also use an internal validation index and a multi-section search technique (which may be based on Fibonacci numbers) to efficiently find the maximum value of the index for a dataset. Advantageously, in accordance with some embodiments the CH index may yield better results for some text clustering applications as compared to other internal validation indexes (e.g., such as the Ball-Hall index, the Hartigan index, the Xu index, etc.).

Some other systems may involve manual analysis and/or selection of a target k parameter. Some systems may attempt to detect a knee-point in a plot of within-set sum of squared errors (WSSSE) for clustering results with different k parameters (e.g., or a knee-point of an algebraic eigenvalue plot). This method may only be suitable for detecting the number of clusters in datasets with well-defined clusters (e.g., spherical clusters in 3D real space in which WSSSE values can be easily analyzed and the knee-point can be detected unambiguously). In some applications, the knee-point may not be explicit and the value of the k parameter may widely vary depending on how the knee-point is defined. This ambiguity inhibits automatic detection of an optimal k parameter for the target number of clusters in some datasets for text mining applications. Detecting the knee-point of such plots automatically may also be relatively more computationally expensive. For example, some techniques may involve applying the k-means technique for each potential value of the k parameter.

Some embodiments may advantageously utilize an internal cluster validation index, such as the CH index, which may have a maximum value near a good or optimal k parameter value (e.g., such that knee-point detection is not required). Some embodiments may be particularly useful for detection of a near optimal number of clusters in document datasets (e.g., for text mining). Some embodiments may utilize spherical k-means clustering technique for k parameter trial executions, CH internal validation index to assess the quality of the clustering, and a multi-section search based on a modified Fibonacci search in order to efficiently find the maximum value of the CH index for a particular dataset. For example, some embodiments may provide an iterative execution of the spherical k-means clustering technique which leads to a maximization of the CH index value, using the modified Fibonacci search to improve or optimize the selection of the k parameter(s) for each iteration.

Some embodiments may solve the problem of selecting a target number of clusters (e.g., the k parameter) for k-means clustering techniques. Some embodiments may be useful for any clustering technique where the target number of clusters may be specified. Some embodiments may be especially suitable for text mining problems, which may also use similar k-means techniques for clustering (e.g., some embodiments may internally use spherical k-means or similar techniques which may be dedicated and fast techniques for text clustering). For example, embodiments may find particular utility for data mining libraries, open- or closed-source, products such as APACHE SPARK, MLIB, INTEL ATK, INTEL TAP, CLOUDERA, HORTONWORKS DATA PLATFORM, or other applications focusing on text mining, text classification, tagging systems, recommendation systems, log monitoring, search engines, biomedical text mining, news analytics, trading systems, sentiment analytics, data analytics, providing analytics services for test case execution logs, etc. Choosing an appropriate value of the k parameter may be important in these and other applications in order to have more valuable clustering results. In accordance with some embodiments, determining an improved or optimal k parameter may also improve convergence of the clustering technique (e.g., if the number of initial centroids in k-means technique is selected properly, it may require less iterations until the cluster assignments are stable).

Figure 5:
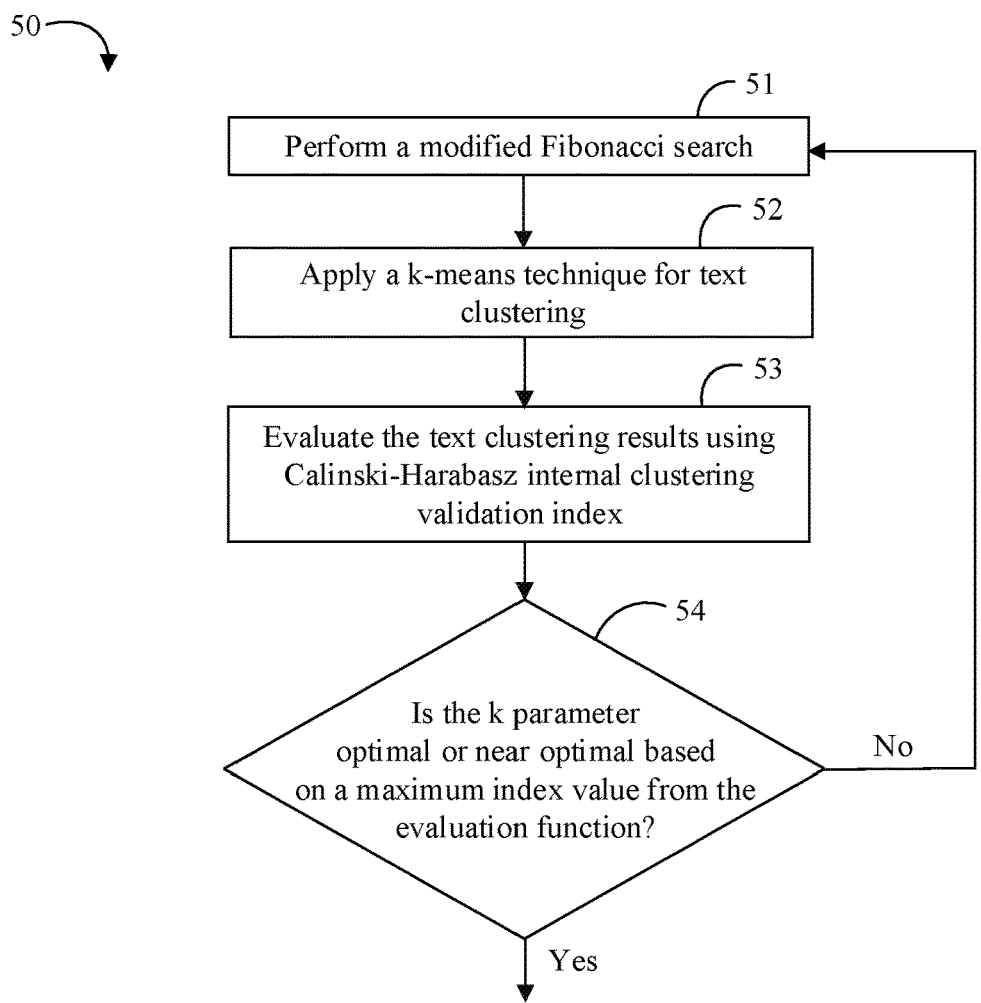
FIG. 5 is a flowchart of an example of a method of determining a target k parameter for a document dataset according to an embodiment.

Turning now to FIG. 5, an embodiment of a method 50 of determining a target k parameter for a document dataset may include performing a modified Fibonacci search at block 51, applying a k-means technique for text clustering at block 52 (e.g., a spherical k-means technique or other fast k-means technique), and evaluating the text clustering results using CH internal clustering validation index at block 53. For example, the modified Fibonacci search may be performed over the space of useful k parameters to find a good or optimal k parameter for the spherical k-means technique using the CH internal validation index as an evaluation function of the text clustering results. From block 53, the method 50 may repeat at block 51 until the k parameter is determined to be optimal or near optimal based on a maximum index value from the evaluation function at block 54.

As noted above, some embodiments may utilize any useful clustering technique which requires or benefits from determining a good or optimal target number of clusters for the clustering. A k-means technique may be applied in data mining and/or in the field of unsupervised learning and clustering. Spherical k-means is a variation of standard k-means technique which uses cosine similarity instead of Euclidean distance as a distance function between clustered objects, which may yield good results in clustering of text documents (e.g., text mining).

Figure 6:
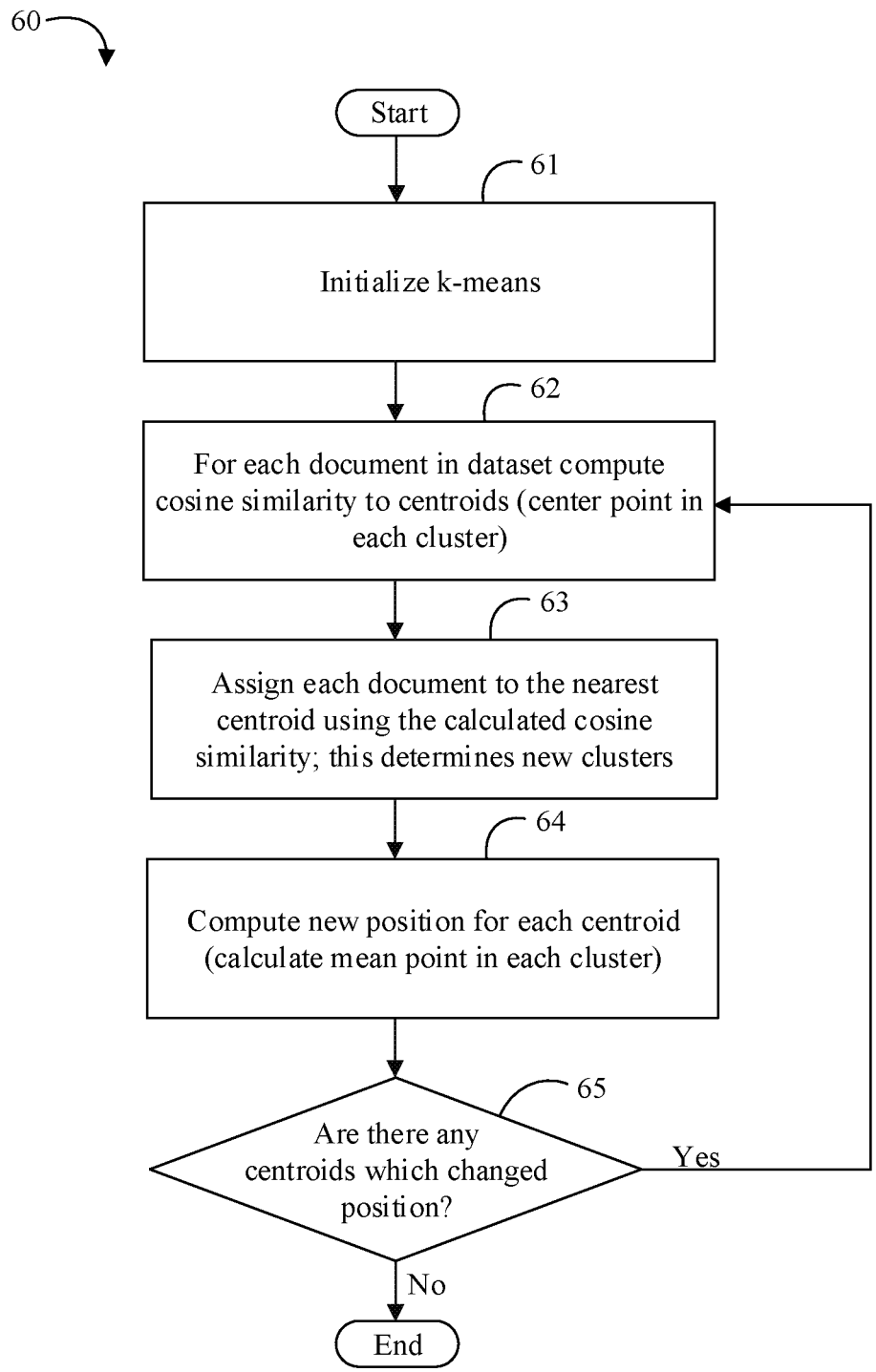
FIG. 6 is a flowchart of an example of a method of applying a spherical k-means technique for clustering a document dataset into k clusters according to an embodiment.

Turning now to FIG. 6, an embodiment of a method 60 of applying a spherical k-means technique for clustering a document dataset into k clusters may include initializing the technique by choosing randomly (e.g., or using other method, such as k-means++) k documents as initial centroids (e.g., centers/mean points of a given cluster) at block 61. The method 60 may then calculate the cosine similarity of each document in the dataset to each centroid at block 62 using the following equation:

$$(x, y) = \frac{x \cdot y}{\|x\|_2 * \|y\|_2} \quad \text{(Eq. 1)}$$

where x and y are vector representation of documents (or centroids) in inverse document-frequency space, x·y is a vector dot product, and $\|x\|_2$ and $\|y\|_2$ are Euclidean lengths (or $L^2$ norms) of the x and y vectors respectively. The method 60 may then assign each document to the nearest centroid based on the calculated cosine similarity value at block 63 (e.g., this assignment determines new clusters). The method 60 may then calculate new positions of centroids in the dataset by determining mean points of all documents (vectors) in each cluster at block 64. At block 65, the method 60 may determine if any centroid has changed its position. If so, the method 60 repeats at block 62. Otherwise, the clustering is complete and the current cluster assignment may be the output as the final clustering.

Some embodiments may use any useful cluster validation index which exhibits a peak index value near a good or optimal number of clusters. Cluster validation indexes may refer to measures which assess the quality of dataset clustering produced by a clustering technique. The indexes may be classified as either internal, if based on internal criteria, or external, if based on external criteria. External criteria indexes may assess clustering in a supervised manner (e.g., they require external, reference (e.g., manual) labelling of documents in order to be calculated). The labelling is often performed by a human and is known only for good, reference datasets. On the other hand, internal criteria indexes may assess clustering based only on the clustering result and its internal properties (e.g., such as the distance of each document to the center of the cluster). Accordingly, internal clustering validation indexes may be more suitable for real use cases, where an external labelling is rarely known.

Two calculations utilized by some internal indexes may include a sum-of-squares within clusters (SSWC) and a sum-of-squares between clusters (SSBC). These calculations may refer to traces of an intra-cluster covariance matrix W and an inter-cluster covariance matrix B respectively (t(W) and tr(B)). For example, SSWC may be represented in equation form as:

$$SSWC = tr(W) = \Sigma_{i=1}^{n} d(x_i, c(x_i))^2 \quad \text{(Eq. 2)}$$

where n is size of the dataset being clustered, d(x, y) is a distance function (e.g., cosine similarity in case of spherical k-means) between a point (document) x and a point (document) y, and c(x) is a centroid of the cluster to which the point (document) x belongs. For example, SSBC may be represented in equation form as:

$$SSBC = tr(B) = \Sigma_{i=1}^{k} d(c_i, \bar{x})^2 \quad \text{(Eq. 3)}$$

where k is number of clusters in the dataset (e.g., equal to the parameter k in k-means technique), $c_i$ is a centroid of the $i^{th}$ cluster, and $\bar{x}$ is the average of all points in the dataset.

Figure 7:
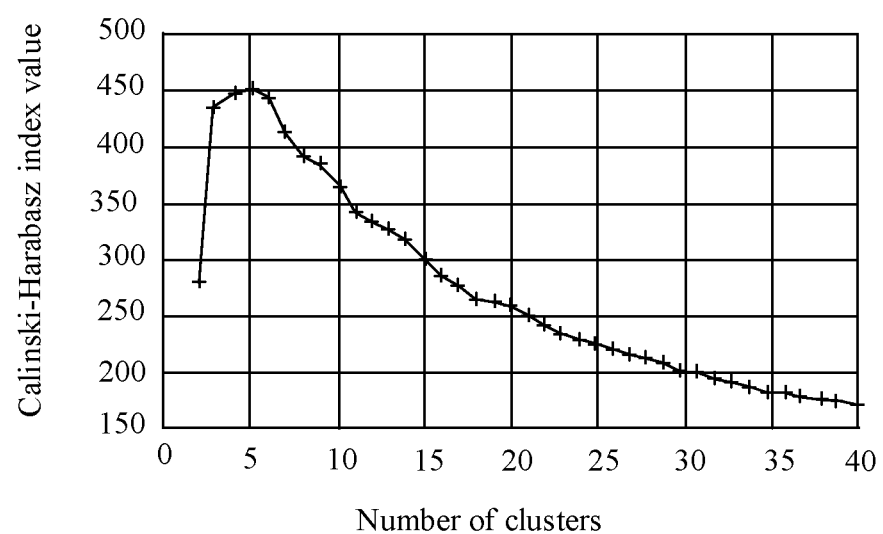
FIG. 7 is an illustrative graph of an example of numbers of clusters versus a Calinski-Harabasz index value according to an embodiment.

Turning now to FIG. 7, an illustrative graph shows a CH index calculation applied to the R8 dataset for k values between 2 and 40. As can be seen from the graph, the CH index may be readily analyzed by searching for a maximum value of the index (e.g., as compared to other indexes which may require a more complicated knee point analysis). For text mining applications, the CH index may generally exhibit this peak index value property for real datasets. Advantageously, as described in more detail below, some embodiments may utilize a multi-section search to quickly locate the peak index value.

Without being limited to theory of operation or particular implementations, the CH index may be represented in equation form as a ratio of SSBC and SSWC with a normalization term (n−k)/(k−1) which prevents its monotonic increase:

$$ch_k = \frac{tr(B)}{tr(W)} * \frac{n-k}{k-1} = \frac{SSBC}{SSWC} * \frac{n-k}{k-1} \quad \text{(Eq. 4)}$$

where n is number of documents in the dataset, k is number of clusters produced by the technique (e.g., equal to the k parameter in spherical k-means) and SSBC and SSWC are described as above.

Figure 8:
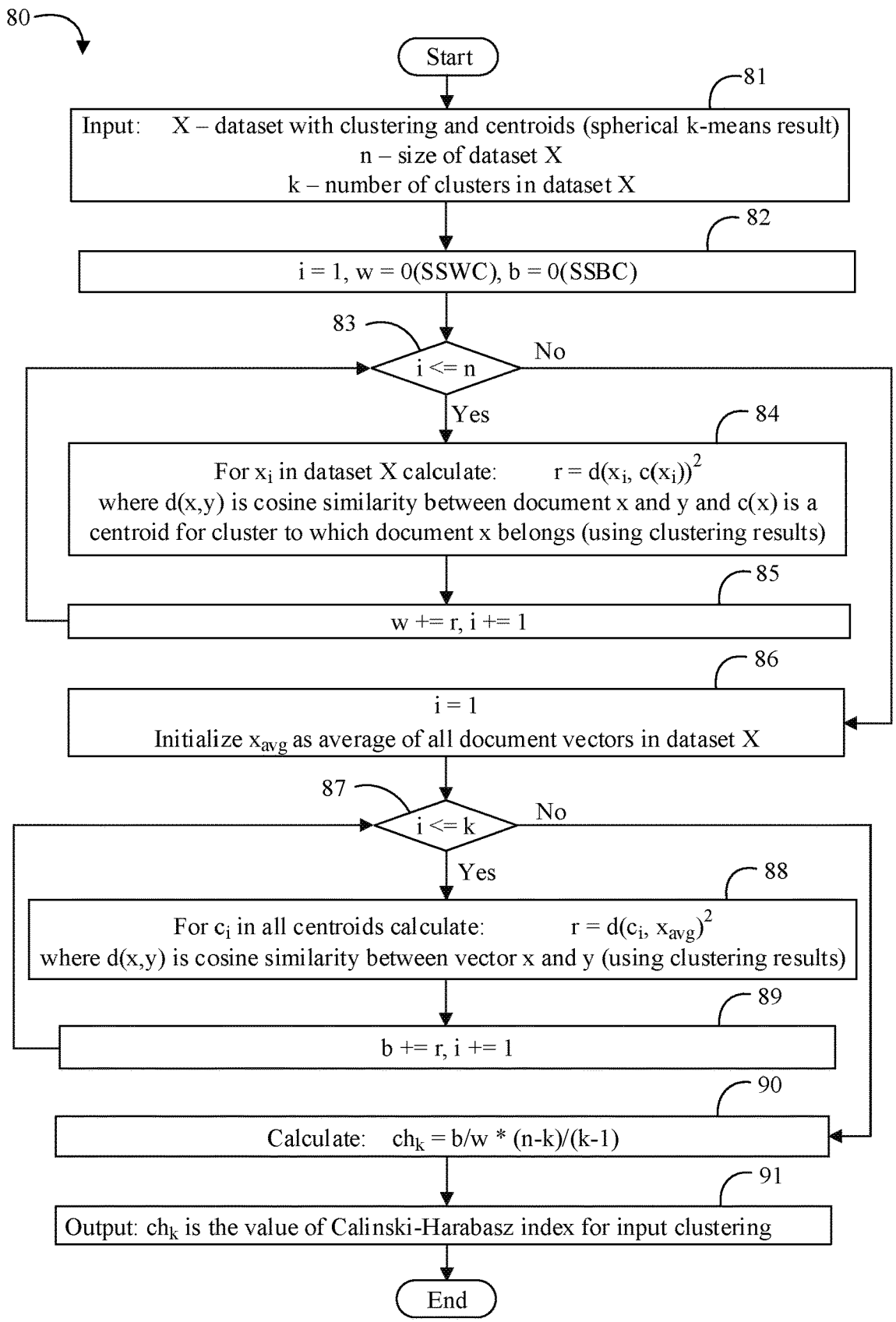
FIG. 8 is a flowchart of an example of a method of determining a CH internal validation index value according to an embodiment.

Turning now to FIG. 8, an embodiment of a method 80 of determining a CH internal validation index value may include inputting a dataset X (e.g., with clustering results), a size of the dataset, and the number of clusters in the dataset (e.g., the k parameter) at block 81, and setting some initial values including a counter, a SSBC value, and a SSWC value at block 82. At block 83, the counter value is checked to ensure that every object in the dataset is processed. If the counter is less than or equal to the size of the dataset at block 83, the cosine similarity is determined for the object and the centroid to which the object belongs at block 84. At block 85, the counter is incremented, the value of the cosine similarity is added to the SSWC value, and the method 80 continues at block 83 until all the cosine similarities for each object in the dataset have been determined and added to the SSWC value. When the counter is greater than the size of the dataset at block 83, an average value of the cosine similarities for the dataset is determined (e.g., the summed SSWC value divided by the size of the dataset), and the counter is re-initialized at block 86.

At block 87, the counter value is checked to ensure that all clusters are processed. If the counter is less than or equal to the number of clusters at block 87, the square of the cosine similarity is determined between each centroid in the cluster and the average value of the cosine similarities for the dataset at block 88. At block 89, the counter is incremented, the determined squared cosine similarity value is added to the SSBC value, and the method 80 continues at block 87 until all clusters have been processed. When the counter is greater than the number of clusters at block 87, the CH index value may be determined in accordance with Eq. 4 at block 90 and the value may be output at block 91.

Some embodiments may use any useful search technique to identify a peak or maximum CH index value without calculating a CH index value for every value of the k parameter. For example, various binary or multi-section search techniques may be utilized to converge upper and lower bounded k values to an optimal or near-optimal k value for a particular dataset. Some embodiments may advantageously utilize a modified Fibonacci search to determine a good or optimal value for the k parameter for a document-based dataset. The Fibonacci numbers sequence may be defined as $F_0=0$, $F_1=1$, $F_N=F_{N-1}+F_{N-2}$. A conventional Fibonacci search may involve various real number calculations, but some embodiments may be modified for a finite set search to utilize floor and ceiling functions (e.g., floor(x) and ceil(x)) to work with natural numbers instead. The floor(x) function may map a real number to the largest previous integer relative to x (e.g., floor(x)=the largest integer not greater than x). The ceil(x) function may map a real number to the smallest following integer relative to x (e.g., ceil(x)=the smallest integer not less than x).

In addition, or alternatively, some embodiments may advantageously save and re-use various search endpoint values such that those values are not recalculated (e.g., prior results may be saved and re-used). For example, in some embodiments only one endpoint of the search interval may be changed. For an [x, b] search interval, for example, only the new value of y may need to be calculated (e.g., the new value of x may be the old value of y). Similarly, for an [a, y] search interval only the new value of x may need to be calculated (e.g., the new value of y may be the old value of x). Advantageously, reducing the number of calculations may save processing cycles and/or power consumption. The k parameter may be an integer value and, in some embodiments, the spherical k-means execution and computation of the CH internal index for clustering results may be considered as a function from the set of natural numbers (k parameter values) into the set of real numbers (values of CH index). The modified Fibonacci search may then be applied for a function $f(x)$ where $f(x)$ may be defined as an execution of spherical k-means with k=x, and a calculation of the CH validation index for the clustering results.

Figure 9:
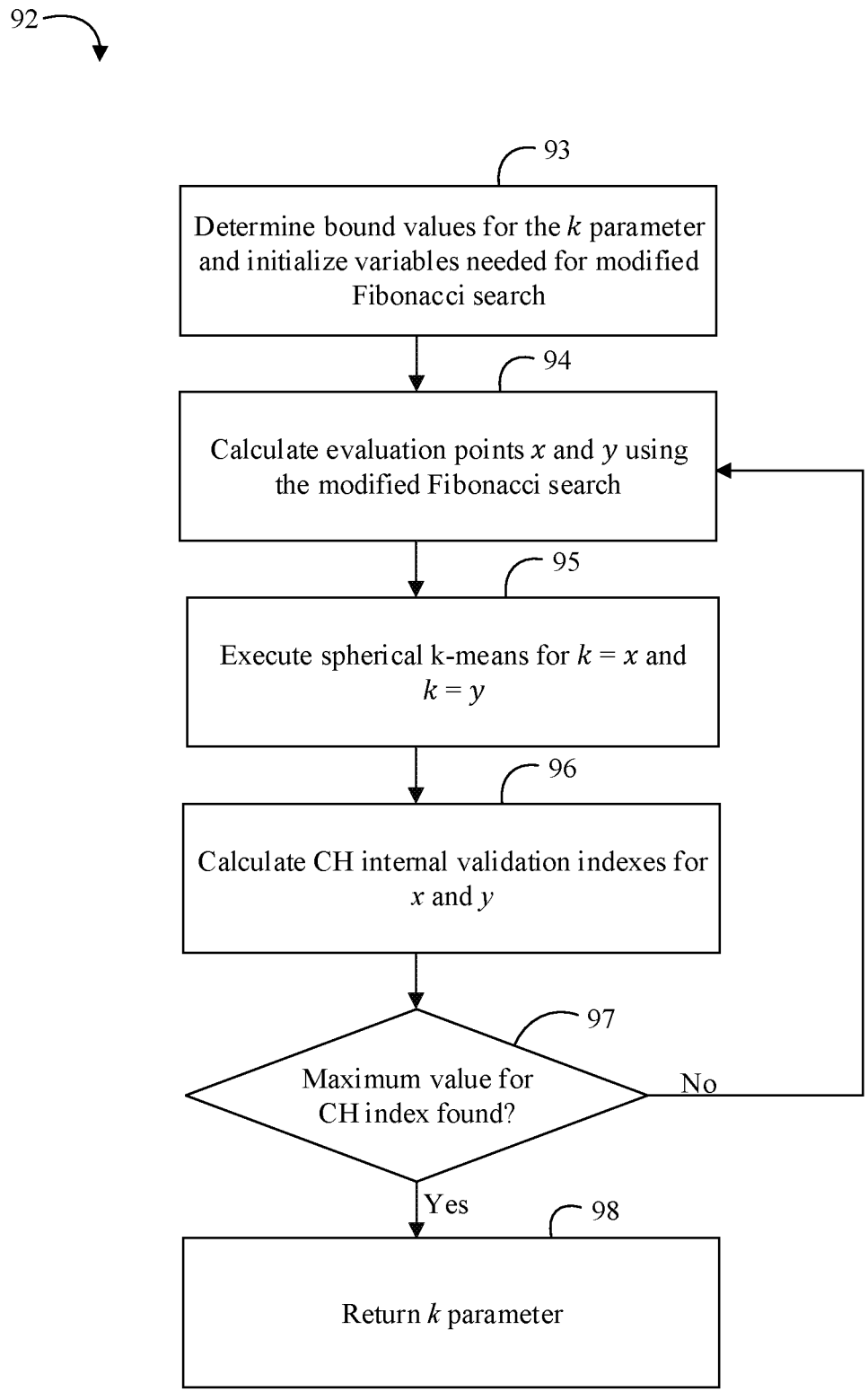
FIG. 9 is a flowchart of an example of a method of determining a target number of clusters according to an embodiment.

Turning now to FIG. 9, an embodiment of a method 92 of determining a target number of clusters k may include determining bound values for the k parameter and initializing variables needed for a modified Fibonacci search at block 93, calculating evaluation points x and y using the modified Fibonacci search at block 94, executing spherical k-means for k=x (e.g., if the CH index is not known for x) and k=y (e.g., if the CH index is not known for y) at block 95, and calculating CH internal validation indexes at block 96 for the clustering results from block 95. For example, block 95 may include performing the method 60 (FIG. 6) of applying a spherical k-means technique, while block 96 may include performing the method 80 (FIG. 8) of determining a CH internal validation index value. If the maximum value for the CH index has been found at block 97 (e.g., within some tolerance), the value of the corresponding k parameter may be returned at block 98. Otherwise, the next evaluation points for the modified Fibonacci search may be determined at block 94 (e.g., based on the calculated index values) and the process may repeat until the evaluations points converge on the maximum CH index value (e.g., based on a convergence threshold).

Figure 10A:
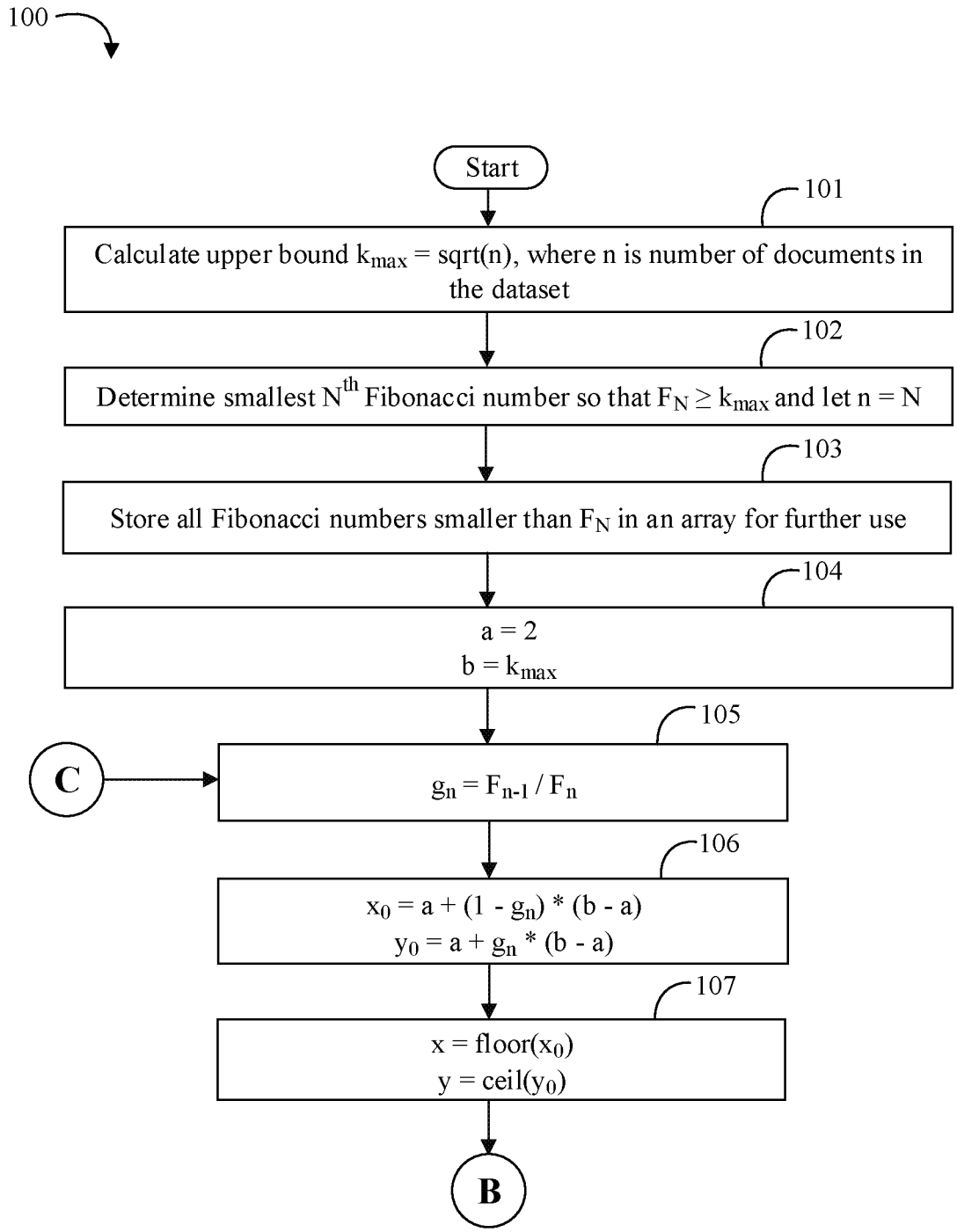
FIGS. 10A to 10B are flowcharts of another example of a method of determining a target number of clusters according to an embodiment.
Figure 10B:
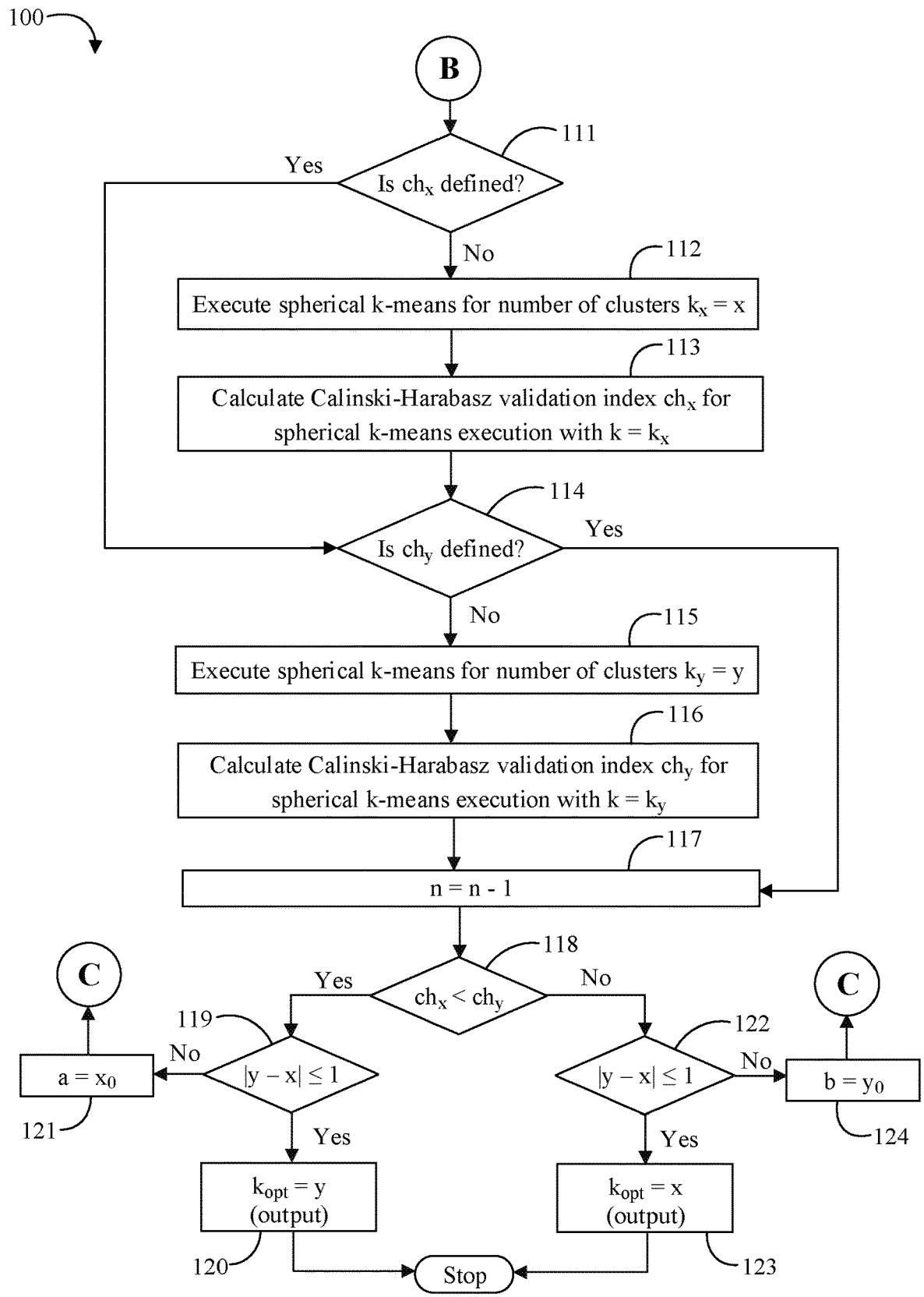

Turning now to FIGS. 10A to 10B, an embodiment of a method 100 of determining a target number of clusters k for a document dataset may include calculating an initial upper bound $k_{max}$ as the square root of n at block 101, where n corresponds to the number of documents in the dataset. At block 102, the method 100 may determine the smallest $N^{th}$ Fibonacci number where $F_N$ is greater than or equal to $k_{max}$, and set n to correspond to N. All Fibonacci numbers smaller than $F_N$ may be stored in an array at block 103 for further use (e.g., for subsequent calculations involving the Fibonacci numbers). At block 104, an initial search interval [a, b] may be set as a equal to 2 and b equal to $k_{max}$. At block 105, a ratio of two consecutive Fibonacci numbers may be calculated as $g_n=F_{n-1}/F_n$. Initial evaluation points may be determined at block 106 with $x_0=a+(1-g_n)(b-a)$ and $y_0=a+g_n(b-a)$. The points calculated at block 106 may be modified at block 107 with a floor function applied to $x_0$ (x=floor($x_0$)) and a ceiling function applied to $y_0$ (y=ceil($y_0$)).

The method 100 may then continue at block 111, where the method 100 may determine if an CH internal validation index $ch_x$ has already been calculated for x (e.g., from a previous iteration). If $ch_x$ is not defined, the method 100 may execute the spherical k-means on the dataset for a number of clusters $k_x$ equal to x at block 112 (e.g., using the method 60 from FIG. 6), and calculate the CH validation index $ch_x$ at block 113 for the results from block 112.

If $ch_x$ is defined at block 111, or after it is calculated at block 114, the method 100 may then continue at block 114, where the method 100 may determine if an CH internal validation index $ch_y$ has already been calculated for y (e.g., from a previous iteration). If $ch_y$ is not defined, the method 100 may execute the spherical k-means on the dataset for a number of clusters $k_y$ equal toy at block 115 (e.g., using the method 60 from FIG. 6), and calculate the CH validation index $ch_y$ at block 116 for the results from block 115.

The value of n may be decremented at block 117, and the method 100 may then determine if $ch_x$ is less than $ch_y$ at block 118. If $ch_x$ is determined to be less than $ch_y$ at block 118, the method 100 may determine if the evaluation points have converged to within a convergence threshold at block 119. For example, if the absolute difference between x and y is less than or equal to one (1) at block 119, then there are no more possible values for the k parameter between x and y and the method 100 may determine the optimal target number of cluster $k_{opt}$ as equal toy at block 120 (e.g., and output the same as needed). If the absolute difference between x and y is greater than one (1) at block 119, then the search interval may be adjusted with a set equal to $x_0$ at block 121 and the method 100 repeating starting at block 105.

If $ch_x$ is determined to be greater than or equal to $ch_y$ at block 118, the method 100 may determine if the evaluation points have converged to within a convergence threshold at block 122. For example, if the absolute difference between x and y is less than or equal to one (1) at block 122, then there are no more possible values for the k parameter between x and y and the method 100 may determine the optimal target number of cluster $k_{opt}$ as equal to x at block 123 (e.g., and output the same as needed). If the absolute difference between x and y is greater than one (1) at block 122, then the search interval may be adjusted with b set equal to $y_0$ at block 124 and the method 100 repeating starting at block 105.

Some embodiments may advantageously detect an optimal number of clusters in text mining using a CH index-based Fibonacci search. As compared to a simple search of maximum values, some embodiments may provide much better convergence speed. For example, the modified Fibonacci search may search through 10946 values of parameter k in just 20 iterations (e.g., due to properties of the Fibonacci number sequence), whereas a traditional search of value by value would require as much as 10946 iterations. Each iteration may include a spherical k-means execution for given k and CH index calculations for clustering results. If the spherical k-means technique is assumed to require about 10 minutes for a single run (e.g., text clustering may be much more time consuming than other clustering problems) and the CH index is calculated in about 30 s, some embodiments may take about 3 hours and 30 minutes to find an optimal or near optimal number of clusters while some traditional methods of iterating over k parameter may require over 1900 hours of calculation time. Advantageously, some embodiments may reduce the execution time even further by generally having only one clustering execution per iteration by reusing clustering results from previous iterations (e.g., reducing the number of the more time-consuming portion of the process).

In some embodiments, the characteristics of the CH index value plot may be dependent on the quality of an initialization method used in the spherical k-means technique. Utilizing standard randomized initialization methods may yield poorer clustering results and may cause the CH index values to have multiple local maxima. Some embodiments may execute multiple spherical k-means trial runs and calculate an average/median value of the resulting index values. Alternatively, or additionally, some embodiments may utilize an advanced spherical k-means initialization method, such as k-means++. This probabilistic method may require more time but also may yield better clustering results which are more repeatable between different trial runs.

Some embodiments may advantageously be horizontally scalable. For example, spherical k-means may be used in scalable, big data environments. Scaling out of the technique may require or benefit from a master node (e.g., such as the master worker in APACHE SPARK) which may determine the next evaluation points and send trial clustering execution tasks to worker nodes which scale the k-means workload to other nodes. In some embodiments, the calculation of the CH index may be also parallelized on different cluster nodes, in a similar manner as the k-means executions may be parallelized.

Figure 11:
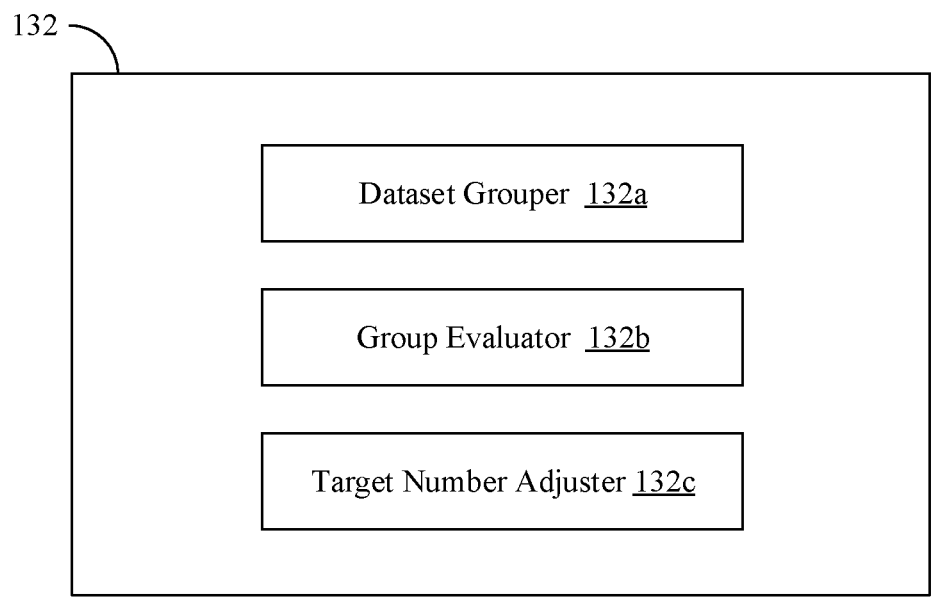
FIGS. 11 and 12 are block diagrams of examples of target number setter apparatuses according to embodiments.

FIG. 11 shows a target number setter apparatus 132 (132*a*-132*c*) that may implement one or more aspects of the method 30 (FIGS. 3A to 3B), the method 50 (FIG. 5), the method 60 (FIG. 6), the method 80 (FIG. 8), the method 92 (FIG. 9), and/or the method 100 (FIGS. 10A to 10B). The target number setter apparatus 132, which may include logic instructions, configurable logic, fixed-functionality hardware logic, may be readily substituted for the logic 14 (FIG. 1), the logic 22 (FIG. 2), or the target number setter 40 (FIG. 4), already discussed. A dataset grouper 132*a* may group data objects of a dataset into first and second groups (e.g., clusters) respectively based on a first and second number of clusters for a search of the dataset. A group evaluator 132*b* may evaluate the first and second groups to determine respective first and second cluster validation indexes. A target number adjuster 132*c* may adjust one or more of the first and second number of clusters based on the first and second cluster validation indexes (e.g., to converge near a peak cluster validation index).

In some embodiments, the target number setter 132 may determine a target number of clusters based on the first and second number of clusters when the first and second number of clusters have converged near the peak cluster validation index. In some embodiments, the group evaluator 132*b* may evaluate the first and second groups to determine respective first and second internal cluster validation indexes. For example, the group evaluator 132*b* may evaluate the first and second groups to determine respective first and second CH indexes. In some embodiments, the target number adjuster 132*c* may adjust one or more of the first and second number of clusters based on Fibonacci numbers (e.g., associated with the determined first and second internal cluster validation indexes). For example, the dataset may comprise a set of text documents.

Figure 12:
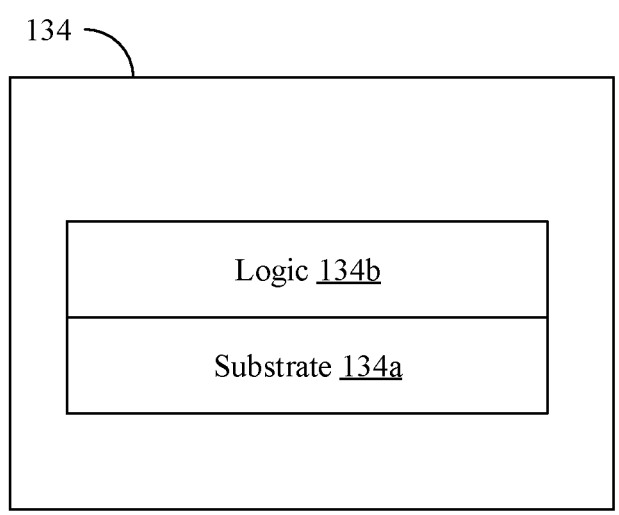

Turning now to FIG. 12, target number setter apparatus 134 (134*a*, 134*b*) is shown in which logic 134*b* (e.g., transistor array and other integrated circuit/IC components) is coupled to a substrate 134*a* (e.g., silicon, sapphire, gallium arsenide). The logic 134*b* may generally implement one or more aspects of the method 30 (FIGS. 3A to 3B), the method 50 (FIG. 5), the method 60 (FIG. 6), the method 80 (FIG. 8), the method 92 (FIG. 9), and/or the method 100 (FIGS. 10A to 10B). Thus, the logic 134*b* may group data objects of a dataset into first and second groups (e.g., clusters) respectively based on a first and second number of clusters for a search of the dataset, evaluate the first and second groups to determine respective first and second cluster validation indexes, and adjust one or more of the first and second number of clusters based on the first and second cluster validation indexes (e.g., to converge near a peak cluster validation index). For example, the logic 134*b* may determine a target number of clusters based on the first and second number of clusters when the first and second number of clusters have converged near the peak cluster validation index. In some embodiments, the logic 134*b* may evaluate the first and second groups to determine respective first and second internal cluster validation indexes. For example, the logic 134*b* may evaluate the first and second groups to determine respective first and second CH indexes. In some embodiments, the logic 134*b* may adjust one or more of the first and second number of clusters based on Fibonacci numbers (e.g., associated with the determined first and second internal cluster validation indexes). For example, the dataset may comprise a set of text documents. In one example, the apparatus 134 is a semiconductor die, chip and/or package.

Figure 13:
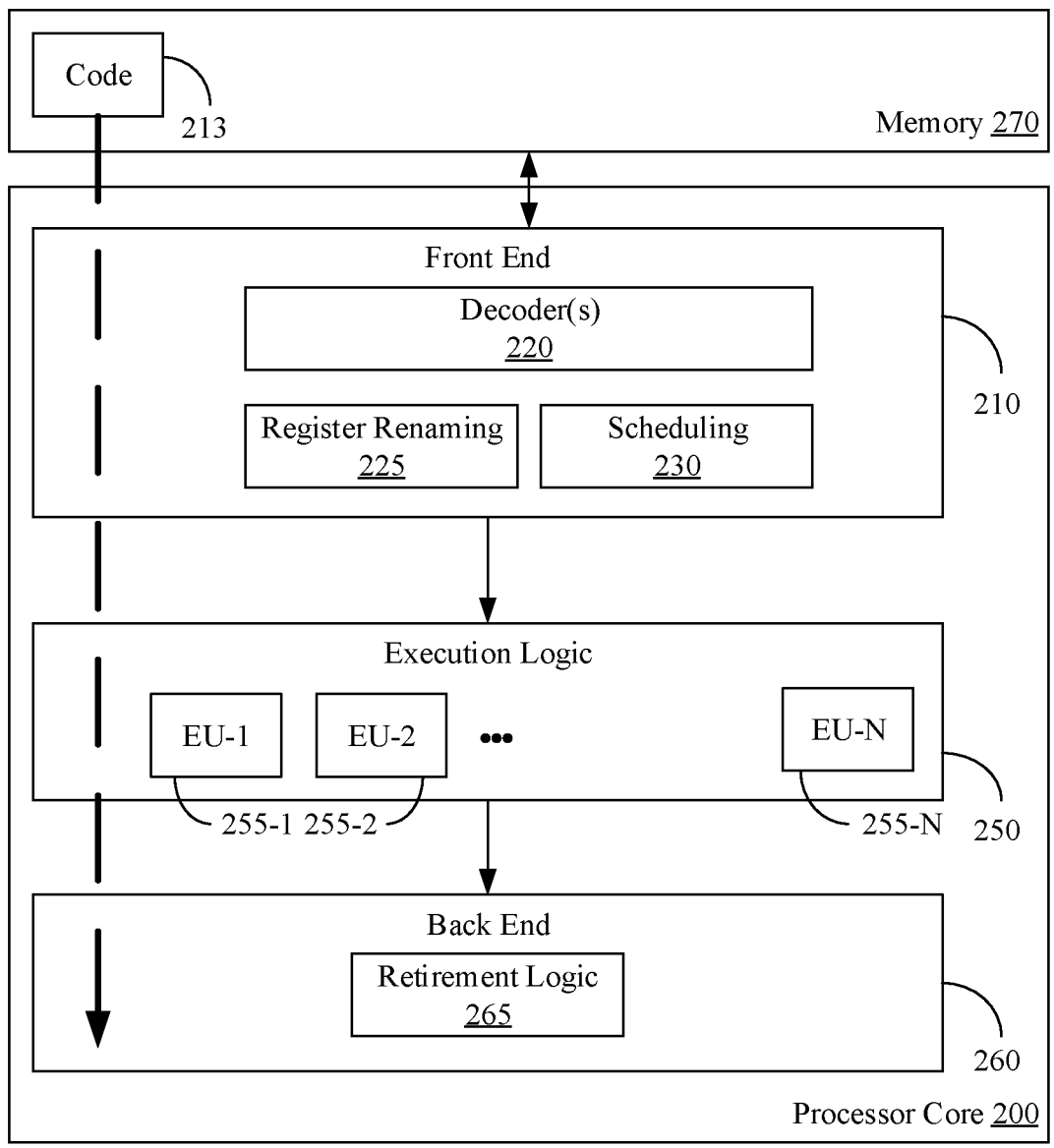
FIG. 13 is a block diagram of an example of a processor according to an embodiment.

FIG. 13 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 13, a processing element may alternatively include more than one of the processor core 200 illustrated in FIG. 13. The processor core 200 may be a single-threaded core or, for at least one embodiment, the processor core 200 may be multithreaded in that it may include more than one hardware thread context (or "logical processor") per core.

FIG. 13 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIGS. 3A to 3B), the method 50 (FIG. 5), the method 60 (FIG. 6), the method 80 (FIG. 8), the method 92 (FIG. 9), and/or the method 100 (FIGS. 10A to 10B), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 13, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 14:
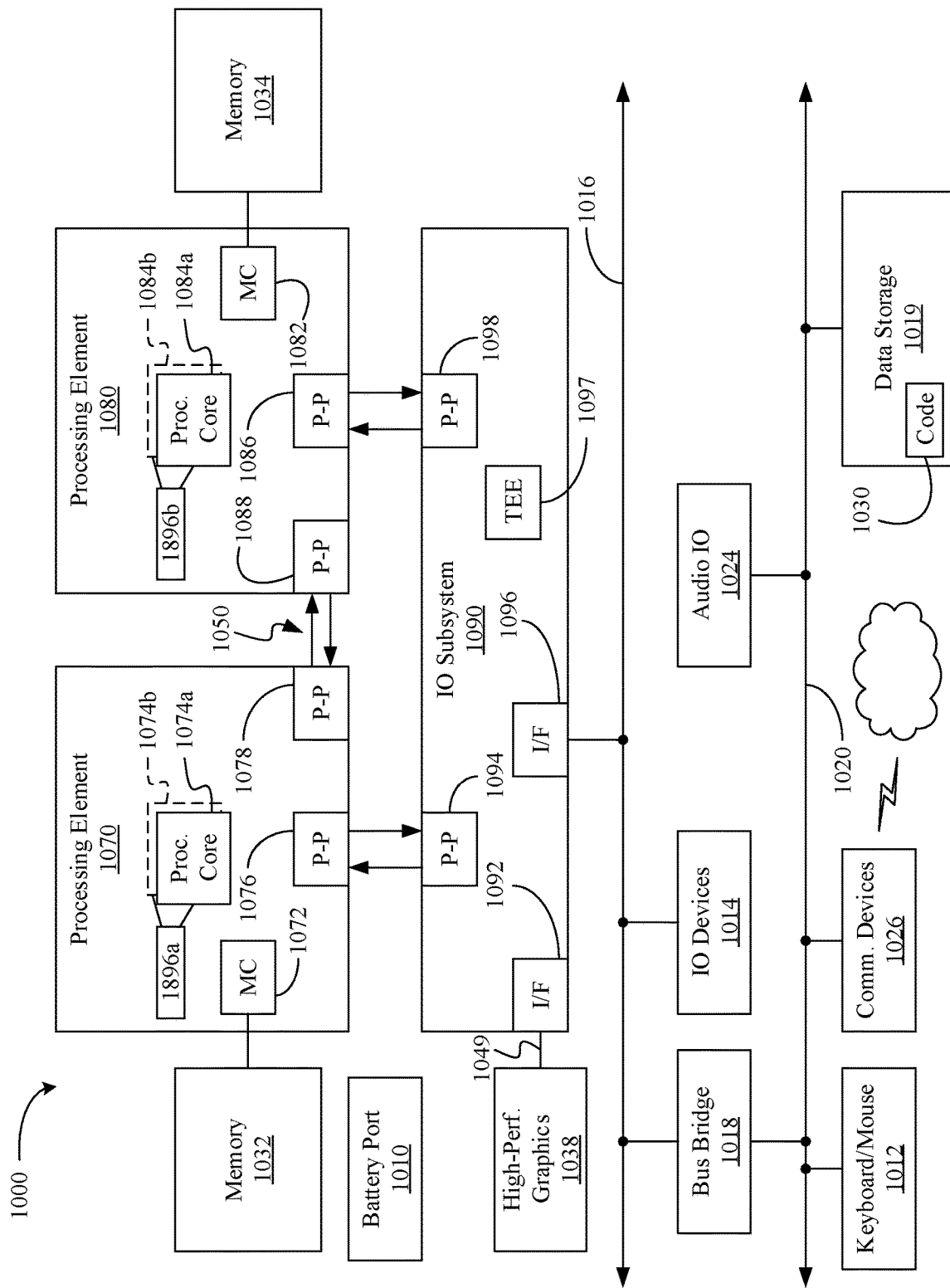
FIG. 14 is a block diagram of an example of a system according to an embodiment.

Referring now to FIG. 14, shown is a block diagram of a system 1000 embodiment in accordance with an embodiment. Shown in FIG. 14 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 14 may be implemented as a multi-drop bus rather than point-to-point interconnect.

As shown in FIG. 14, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 13.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 14, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 14, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, graphics engine 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 14, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 30 (FIGS. 3A to 3B), the method 50 (FIG. 5), the method 60 (FIG. 6), the method 80 (FIG. 8), the method 92 (FIG. 9), and/or the method 100 (FIGS. 10A to 10B), already discussed, and may be similar to the code 213 (FIG. 13), already discussed. Further, an audio I/O 1024 may be coupled to second bus 1020.

Note that other embodiments are contemplated. For example, instead of the point-to-point architecture of FIG. 14, a system may implement a multi-drop bus or another such communication topology.

Additional Notes and Examples

Example 1 may include an electronic processing system, comprising a processor, memory communicatively coupled to the processor, and logic communicatively coupled to the processor to group data objects of a dataset into first and second groups respectively based on a first and second number of clusters for a search of the dataset, evaluate the first and second groups to determine respective first and second cluster validation indexes, and adjust one or more of the first and second number of clusters based on the first and second cluster validation indexes.

Example 2 may include the system of Example 1, wherein the logic is further to determine a target number of clusters based on the first and second number of clusters when the first and second number of clusters have converged near a peak cluster validation index.

Example 3 may include the system of Example 1, wherein the logic is further to evaluate the first and second groups to determine respective first and second internal cluster validation indexes.

Example 4 may include the system of Example 3, wherein the logic is further to evaluate the first and second groups to determine respective first and second Calinski-Harabasz indexes.

Example 5 may include the system of any of Examples 1 to 4, wherein the logic is further to adjust one or more of the first and second number of clusters based on Fibonacci numbers associated with the determined first and second internal cluster validation indexes.

Example 6 may include the system of any of Examples 1 to 4, wherein the dataset comprises a set of text documents.

Example 7 may include a semiconductor package apparatus, comprising a substrate, and logic coupled to the substrate, wherein the logic is at least partly implemented in one or more of configurable logic and fixed-functionality hardware logic, the logic coupled to the substrate to group data objects of a dataset into first and second groups respectively based on a first and second number of clusters for a search of the dataset, evaluate the first and second groups to determine respective first and second cluster validation indexes, and adjust one or more of the first and second number of clusters based on the first and second cluster validation indexes.

Example 8 may include the apparatus of Example 7, wherein the logic is further to determine a target number of clusters based on the first and second number of clusters when the first and second number of clusters have converged near a peak cluster validation index.

Example 9 may include the apparatus of Example 7, wherein the logic is further to evaluate the first and second groups to determine respective first and second internal cluster validation indexes.

Example 10 may include the apparatus of Example 9, wherein the logic is further to evaluate the first and second groups to determine respective first and second Calinski-Harabasz indexes.

Example 11 may include the apparatus of any of Examples 7 to 10, wherein the logic is further to adjust one or more of the first and second number of clusters based on Fibonacci numbers associated with the determined first and second internal cluster validation indexes.

Example 12 may include the apparatus of any of Examples 7 to 10, wherein the dataset comprises a set of text documents.

Example 13 may include a method of adjusting a number of clusters, comprising grouping data objects of a dataset into first and second groups respectively based on a first and second number of clusters for a search of the dataset, evaluating the first and second groups to determine respective first and second cluster validation indexes, and adjusting one or more of the first and second number of clusters based on the first and second cluster validation indexes.

Example 14 may include the method of Example 13, further comprising determining a target number of clusters based on the first and second number of clusters when the first and second number of clusters have converged near a peak cluster validation index.

Example 15 may include the method of Example 13, further comprising evaluating the first and second groups to determine respective first and second internal cluster validation indexes.

Example 16 may include the method of Example 15, further comprising evaluating the first and second groups to determine respective first and second Calinski-Harabasz indexes.

Example 17 may include the method of any of Examples 13 to 16, further comprising adjusting one or more of the first and second number of clusters based on Fibonacci numbers associated with the determined first and second internal cluster validation indexes.

Example 18 may include the method of any of Examples 13 to 16, wherein the dataset comprises a set of text documents.

Example 19 may include at least one computer readable medium, comprising a set of instructions, which when executed by a computing device, cause the computing device to group data objects of a dataset into first and second groups respectively based on a first and second number of clusters for a search of the dataset, evaluate the first and second groups to determine respective first and second cluster validation indexes, and adjust one or more of the first and second number of clusters based on the first and second cluster validation indexes.

Example 20 may include the at least one computer readable medium of Example 19, comprising a further set of instructions, which when executed by the computing device, cause the computing device to determine a target number of clusters based on the first and second number of clusters when the first and second number of clusters have converged near a peak cluster validation index.

Example 21 may include the at least one computer readable medium of Example 19, comprising a further set of instructions, which when executed by the computing device, cause the computing device to evaluate the first and second groups to determine respective first and second internal cluster validation indexes.

Example 22 may include the at least one computer readable medium of Example 21, comprising a further set of instructions, which when executed by the computing device, cause the computing device to evaluate the first and second groups to determine respective first and second Calinski-Harabasz indexes.

Example 23 may include the at least one computer readable medium of any of Examples 19 to 22, comprising a further set of instructions, which when executed by the computing device, cause the computing device to adjust one or more of the first and second number of clusters based on Fibonacci numbers associated with the determined first and second internal cluster validation indexes.

Example 24 may include the at least one computer readable medium of any of Examples 19 to 22, wherein the dataset comprises a set of text documents.

Example 25 may include a text mining apparatus, comprising means for grouping data objects of a dataset into first and second groups respectively based on a first and second number of clusters for a search of the dataset, means for evaluating the first and second groups to determine respective first and second cluster validation indexes, and means for adjusting one or more of the first and second number of clusters based on the first and second cluster validation indexes.

Example 26 may include the apparatus of Example 25, further comprising means for determining a target number of clusters based on the first and second number of clusters when the first and second number of clusters have converged near a peak cluster validation index.

Example 27 may include the apparatus of Example 25, further comprising means for evaluating the first and second groups to determine respective first and second internal cluster validation indexes.

Example 28 may include the apparatus of Example 27, further comprising means for evaluating the first and second groups to determine respective first and second Calinski-Harabasz indexes.

Example 29 may include the apparatus of any of Examples 25 to 28, further comprising means for adjusting one or more of the first and second number of clusters based on Fibonacci numbers associated with the determined first and second internal cluster validation indexes.

Example 30 may include the apparatus of any of Examples 25 to 28, wherein the dataset comprises a set of text documents.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An electronic processing system, comprising:
a processor;
memory communicatively coupled to the processor; and
logic communicatively coupled to the processor to:
group data objects of a dataset into first and second groups respectively based on a first and second number of clusters for a search of the dataset,
evaluate the first and second groups to determine respective first and second internal cluster validation indexes,
adjust one or more of the first and second number of clusters based on the first and second internal cluster validation indexes, and
execute a modified Fibonacci search to adjust the first and second number of clusters based on first and second Fibonacci numbers associated with the determined first and second internal cluster validation indexes, apply a ceiling function to the adjusted first number of clusters, and apply a floor function to the adjusted second number of clusters.

2. The system of claim 1, wherein the logic is further to:
calculate an initial upper bound based on a number of the data objects;
determine a smallest Fibonacci number that is greater than or equal to the initial upper bound;
store a plurality of Fibonacci numbers in a data structure based on an identification that each of the plurality of Fibonacci numbers is less than the smallest Fibonacci number;
select the first and second Fibonacci numbers from the data structure based on a number of iterations associated with the modified Fibonacci search; and
determine a target number of clusters based on the first and second number of clusters when the first and second number of clusters have converged near a peak cluster validation index.

3. The system of claim 1, wherein the logic is further to:
evaluate the first and second groups to determine respective first and second Calinski-Harabasz indexes; and
execute a spherical k-means process to group the data objects of the dataset into the first and second groups.

4. The system of claim 1, wherein the dataset comprises a set of text documents.

5. The system of claim 1, wherein the logic is further to:
assign data objects of the dataset to centroids of the clusters;
execute a determination that the first and second numbers of clusters are adjusted based on a comparison of the first number of clusters to the second number of clusters; and
based on the determination, adjust each of the first and second number of clusters based on a ratio of the first and second Fibonacci numbers.

6. A semiconductor package apparatus, comprising:
a substrate; and
logic coupled to the substrate, wherein the logic is at least partly implemented in one or more of configurable logic or fixed-functionality logic hardware, the logic coupled to the substrate to:
group data objects of a dataset into first and second groups respectively based on a first and second number of clusters for a search of the dataset,
evaluate the first and second groups to determine respective first and second internal cluster validation indexes,
adjust one or more of the first and second number of clusters based on the first and second internal cluster validation indexes, and
execute a modified Fibonacci search to adjust the first and second number of clusters based on first and second Fibonacci numbers associated with the determined first and second internal cluster validation indexes, apply a ceiling function to the adjusted first number of clusters, and apply a floor function to the adjusted second number of clusters.

7. The apparatus of claim 6, wherein the logic is further to:
calculate an initial upper bound based on a number of the data objects;
determine a smallest Fibonacci number that is greater than or equal to the initial upper bound;
store a plurality of Fibonacci numbers in a data structure based on an identification that each of the plurality of Fibonacci numbers is less than the smallest Fibonacci number;
select the first and second Fibonacci numbers from the data structure based on a number of iterations associated with the modified Fibonacci search; and
determine a target number of clusters based on the first and second number of clusters when the first and second number of clusters have converged near a peak cluster validation index.

8. The apparatus of claim 6, wherein the logic is further to:
evaluate the first and second groups to determine respective first and second Calinski-Harabasz indexes.

9. The apparatus of claim 6, wherein the dataset comprises a set of text documents.

10. The apparatus of claim 6, wherein the logic is further to:
assign data objects of the dataset to centroids of the clusters;
execute a determination that the first and second numbers of clusters are adjusted based on a comparison of the first number of clusters to the second number of clusters; and
based on the determination, adjust each of the first and second number of clusters based on a ratio of the first and second Fibonacci numbers.

11. A method of adjusting a number of clusters of a dataset, comprising:
grouping data objects of the dataset into first and second groups respectively based on a first and second number of clusters for a search of the dataset;
evaluating the first and second groups to determine respective first and second internal cluster validation indexes;
adjusting one or more of the first and second number of clusters based on the first and second internal cluster validation indexes; and
executing a modified Fibonacci search, wherein the executing includes adjusting the first and second number of clusters based on first and second Fibonacci numbers associated with the determined first and second internal cluster validation indexes, applying a ceiling function to the adjusted first number of clusters, and applying a floor function to the adjusted second number of clusters.

12. The method of claim 11, further comprising:
calculating an initial upper bound based on a number of the data objects;
determining a smallest Fibonacci number that is greater than or equal to the initial upper bound;

storing a plurality of Fibonacci numbers in a data structure based on an identification that each of the plurality of Fibonacci numbers is less than the smallest Fibonacci number;

selecting the first and second Fibonacci numbers from the data structure based on a number of iterations associated with the modified Fibonacci search; and determining a target number of clusters based on the first and second number of clusters when the first and second number of clusters have converged near a peak cluster validation index.

13. The method of claim 11, further comprising:

evaluating the first and second groups to determine respective first and second Calinski-Harabasz indexes.

14. The method of claim 11, wherein the dataset comprises a set of text documents.

15. The method of claim 11, further comprising:

assigning data objects of the dataset to centroids of the clusters;

executing a determination that the first and second numbers of clusters are adjusted based on a comparison of the first number of clusters to the second number of clusters; and based on the determination, adjusting each of the first and second number of clusters based on a ratio of the first and second Fibonacci numbers.

16. At least one computer readable medium, comprising a set of instructions, which when executed by a computing device, cause the computing device to:

group data objects of a dataset into first and second groups respectively based on a first and second number of clusters for a search of the dataset;

evaluate the first and second groups to determine respective first and second internal cluster validation indexes;

adjust one or more of the first and second number of clusters based on the first and second internal cluster validation indexes; and execute a modified Fibonacci search to adjust the first and second number of clusters based on first and second Fibonacci numbers associated with the determined first and second internal cluster validation indexes, apply a ceiling function to the adjusted first number of clusters, and apply a floor function to the adjusted second number of clusters.

17. The at least one computer readable medium of claim 16, comprising a further set of instructions, which when executed by the computing device, cause the computing device to:

calculate an initial upper bound based on a number of the data objects;

determine a smallest Fibonacci number that is to be greater than or equal to the initial upper bound;

store a plurality of Fibonacci numbers in a data structure based on an identification that each of the plurality of Fibonacci numbers is less than the smallest Fibonacci number;

select the first and second Fibonacci numbers from the data structure based on a number of iterations associated with the modified Fibonacci search; and determine a target number of clusters based on the first and second number of clusters when the first and second number of clusters have converged near a peak cluster validation index.

18. The at least one computer readable medium of claim 16, comprising a further set of instructions, which when executed by the computing device, cause the computing device to:

evaluate the first and second groups to determine respective first and second Calinski-Harabasz indexes.

19. The at least one computer readable medium of claim 16, wherein the dataset comprises a set of text documents.

20. The at least one computer readable medium of claim 16, comprising a further set of instructions, which when executed by the computing device, cause the computing device to:

assign data objects of the dataset to centroids of the clusters;

execute a determination that the first and second numbers of clusters are adjusted based on a comparison of the first number of clusters to the second number of clusters; and based on the determination, adjust each of the first and second number of clusters based on a ratio of the first and second Fibonacci numbers.

* * * * *